Feb. 4, 1958 D. DALIN 2,822,136
COMBINED HOT AIR FURNACE AND DOMESTIC WATER HEATER
Filed Dec. 11, 1952 6 Sheets-Sheet 2

Inventor
David Dalin
By [signature]
Attorney

Feb. 4, 1958             D. DALIN              2,822,136

COMBINED HOT AIR FURNACE AND DOMESTIC WATER HEATER

Filed Dec. 11, 1952                      6 Sheets-Sheet 3

Inventor
David Dalin
By [signature]
Attorney

Feb. 4, 1958 D. DALIN 2,822,136
COMBINED HOT AIR FURNACE AND DOMESTIC WATER HEATER
Filed Dec. 11, 1952 6 Sheets-Sheet 5

Inventor
David Dalin
By *[signature]*
Attorney

Feb. 4, 1958     D. DALIN     2,822,136
COMBINED HOT AIR FURNACE AND DOMESTIC WATER HEATER
Filed Dec. 11, 1952     6 Sheets-Sheet 6

Inventor
David Dalin
By
Attorney

United States Patent Office 2,822,136
Patented Feb. 4, 1958

2,822,136

COMBINED HOT AIR FURNACE AND DOMESTIC WATER HEATER

David Dalin, New York, N. Y., assignor to A/B Svenska Maskinverken, Sodertalje, Sweden, a corporation of Sweden Application December 11, 1952, Serial No. 325,383

2 Claims. (Cl. 237—17)

This invention relates to improvements in combination hot air and domestic water heating units. Combinations of this general type which have been proposed previous to this invention invariably have been objectionable for the reason that they were incapable of directing all of the usable heat from the source thereof in whatever proportions were necessary to produce the required amounts of hot air and/or hot water. It is well known that such combined hot air and domestic water heaters in use prior to this invention often produced too much hot water when it was not needed and too little when the hot water demand was heavy. As a consequence the water was often times heated to a dangerously high temperature, and it was annoying to say the least, whenever the water was insufficiently heated.

In general it is the purpose of this invention to overcome these disadvantages of past combination hot air and domestic water heating units by the provision of an apparatus in which all of the available heat from the source, or any desired part thereof, will be automatically employed for the production of hot water or hot air, in proportion to the demands, without decreasing the efficiency of the apparatus or causing overheating such as might damage the apparatus.

Thus, for example, when there is no demand for hot air all of the available heat from the source can be used for producing hot water in response to a great demand therefor; and vice versa, when there is no demand for hot water all of the available heat can be used to heat the air to quickly raise the temperature in the living quarters.

On the other hand, during periods of normal demand for hot air as well as hot water, the heat from the source will be automatically available to heat both in proportion to the varying demands.

A further purpose of this invention is to improve the efficiency of such combination units to such an extent that they may be made considerably smaller than was hitherto possible; for example, a unit constructed according to this invention and having a heating capacity sufficient to supply the needs of an eight room house need be substantially no larger than a modern automatic washing machine. This objective is acheived through a novel heat exchanger construction which takes full advantage of the highly efficient extended surface of Patent No. 2,469,635 issued to David Dalin et al. on May 10, 1949.

Another object of this invention is to facilitate the use, in combined air and water heating apparatus of the character described, of heat exchangers of standardized design and size so that by varying the number of heat exchangers the heating capacity of the combined air and water heater may be varied accordingly.

Another object of this invention resides in the provision of a combined hot air and water heating unit of the character described wherein it will be possible, by the provision of suitable by-pass means for controlling the flow of air through the unit, to circulate either hot, cold or suitably tempered air through the living quarters of a dwelling despite the fact that at the same time the unit may be operating to produce hot water.

Still another object of this invention resides in the provision of main and secondary heat exchangers for heating the air and water and wherein suitable valve controlled by-pass means employed in the connections between the main and secondary heat exchangers permits circulation of a cooling medium through the secondary heat exchanger to effect cooling of the air to be circulated to the living quarters; while at the same time permitting the main heat exchanger to function for the heating of the water for domestic use.

More specifically it is an object of this invention to provide a combined hot air furnace and domestic water heater which is so designed and constructed that air circulates in one direction when the unit is operating to supply both heated air and hot water and is automatically reversed in its flow when the unit serves only as a water heater to thereby effect more efficient heating of the water.

Another object of this invention is to provide a combined hot air furnace and domestic water heater wherein the water chamber or tank in which the water is heated and the air passage in which the air is heated are directly contiguous and have a common wall therebetween, and wherein extended surface on said wall projecting into the air passage effects rapid transfer of heat between the air and the water.

A further object of this invention resides in the provision of a novel manner of heating two fluid media such as air and water for domestic use, which involves the indirect transfer of heat from a source thereof to both of said media concomitantly with the indirect transfer of heat between said media themselves, to thereby assure that the available heat from the source will be automatically applied to the two media in proportion to the relative rates at which said media are passed in indirect heat exchange relation with one another. The practice of this method, therefore, makes it possible to direct all of the available heat from the source thereof into the air when the demand for heating of the living quarters is great, and vice versa makes it possible to direct all of the heat from the source into the domestic water passing through the combined heating unit when the demand for hot water is relatively great.

With the above and other objects in view, which will appear as the description proceeds, this invention resides in the novel method and apparatus substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which.

Figure 1:
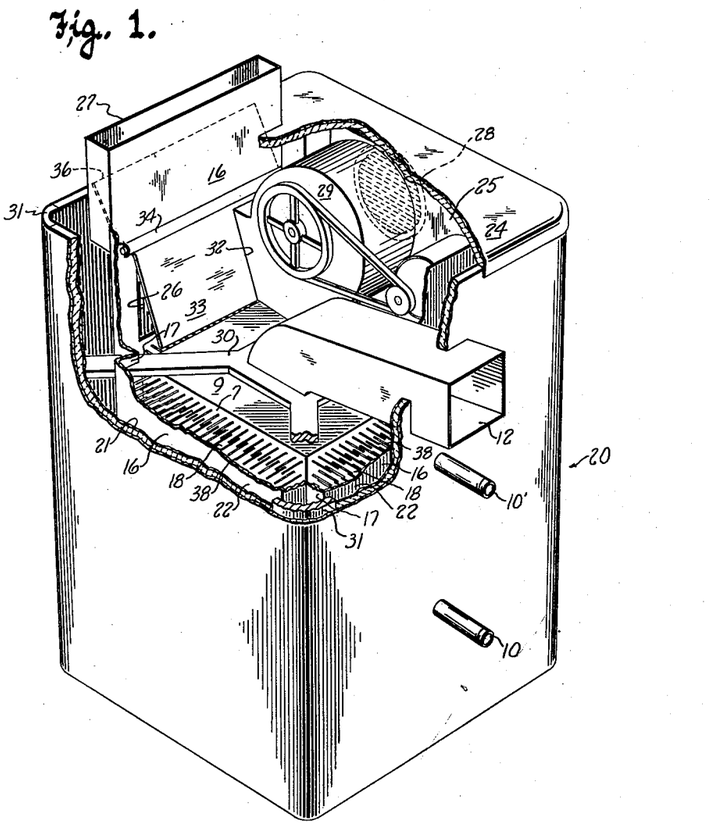
Figure 1 is a perspective view of a combined hot air furnace and domestic water heater embodying this invention, said view having parts broken away and in section.
Figure 2:
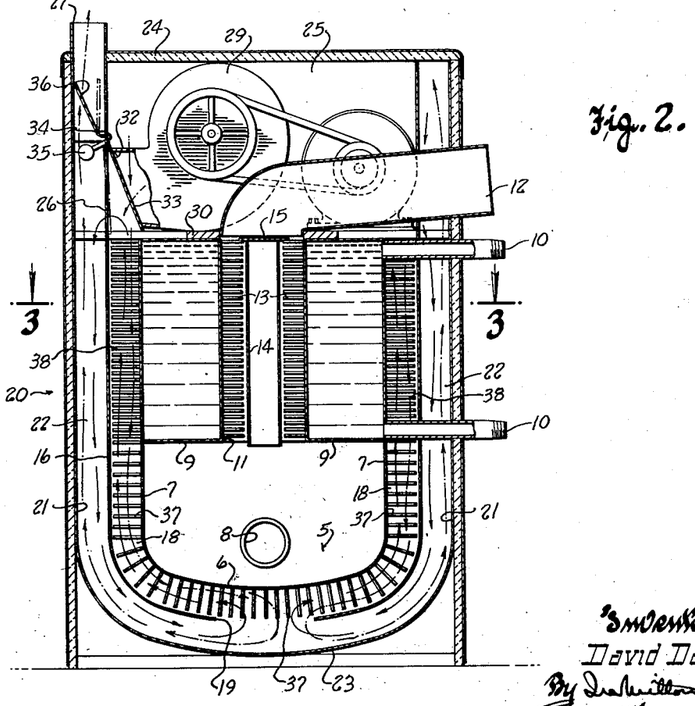
Figure 2 is a vertical sectional view through the unit shown in Figure 1.
Figure 3:
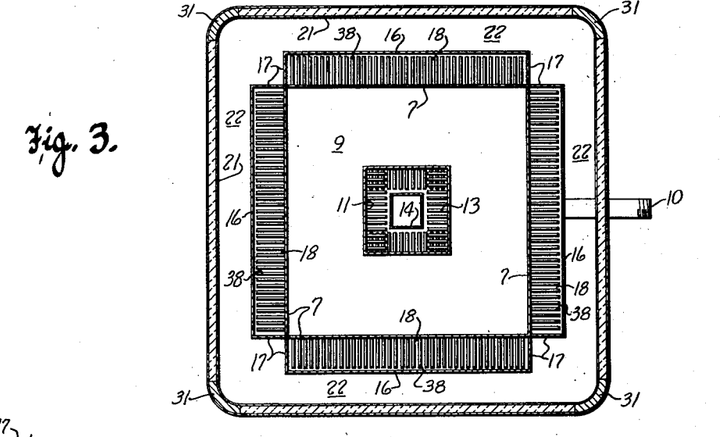
Figure 3 is a cross sectional view taken through Figure 2 on the plane of the line 3—3.

Referring now particularly to the accompanying drawings in which like numerals indicate like parts throughout the several views and more especially to Figures 1 to 3, inclusive, the numeral 5 designates a combustion chamber defined by a bottom wall 6 and upright side walls 7. An inlet port 8 in one upright wall of the combustion chamber accommodates the nozzle of an oil burner (not shown). Obviously, of course, the oil burner may be replaced by a gas burner.

Above the combustion chamber is a heat exchanger having a water chamber or tank 9 which, in this embodiment of the invention, is in the form of a hollow square but for convenience of description the tank will be referred to hereinafter as annular. The water to be heated is fed to the tank 9 through an inlet 10 and drawn therefrom through an outlet 10', and as will be readily appreciated, if desired, the storage capacity of the water chamber 9 may be augmented by an external storage tank (not shown) but suitably connected with the tank 9.

The central space 11 defined by the inner wall of the annular water tank is in open communication with and provides a flue gas passage leading from the top of the combustion chamber 5. At its upper end this central passage 11 is connected to a flue gas duct 12 by which the products of combustion are discharged from the furnace. The flue gases leaving the combustion chamber flow upwardly through the central space 11 in indirect heat exchange relation with the water in the tank, and to assure optimum heat transfer from the gases to the water these inner walls of the water tank have extended surface 13 thereon.

This extended surface is preferably in the form of small diameter wires or rods of copper or other high conductivity metal projecting perpendicularly from the wall of the tank and secured thereto in the manner described for instance in Patent No. 2,584,189 issued to David Dalin on February 5, 1952. Since the length of the extended surface elements is prescribed by the formula of the aforesaid Patent No. 2,469,635, they will not extend across the full width of the passage 11, and to prevent free flow of the gases through the central part thereof which is devoid of extended surface, this central area is blocked off by walls 14 and 15.

The upright walls 7 not only define the sides of the combustion chamber but also provide the outer walls of the water tank and coact with walls 16 and 17 to define upright air passages 18. Where the construction is square as in the embodiment of the invention being described, these passages 18 for convenience of construction are separated from one another, but where the furnace unit is round in cross section there would be but one annular air passage 18. In any event the outer walls 16 of these passages not only extend in parallel spaced relation to the walls 7 but also continue on down around the bottom of the combustion chamber where they terminate to define an opening 19.

The entire unit thus far described is disposed within an outer shell designated generally by the numeral 20 and including upright walls 21 in spaced parallel relation to the walls 16. The walls 21 coact with the walls 16 and 17 to define vertical air passages 22 alongside and exteriorly of the passages 18. At the bottom of the unit these outer air passages 22 communicate with the inner air passages 18 through the opening 19, and to facilitate the circulation of air at this point from one passage to the other the bottom of the casing or shell is closed by a wall 23 which is in parallel spaced relation to the lower curved portions of the walls 16.

The walls 16 and 17 and also the walls 21 of the outer casing extend a substantial distance above the water tank 9 and coact with a top wall 24 to form a plenum chamber 25 with which all of the air passages 18 connect.

The upright air passages 22 are connected with one another circumferentially, as clearly shown in Figure 3, and since the walls 16 and 17 thereof extend all the way to the top wall 24 these connected uprigth air passages 22 are closed off from the plenum chamber 25 except through a port 26 in one of the walls 16. This wall 16 in which the port 26 is located extends through the cover 24 and coacts with other walls to provide a hot air outlet 27 connectible with the space or rooms to be heated.

The air to be heated is fed to the unit through an inlet 28 which leads to a motor driven blower 29 mounted in the plenum chamber 25. The blower 29 and its drive motor are supported by a spider-like frame 30, the arms of which pass through the corners of the walls 16 and 17 and are secured to upright corner posts 31. This spider-like frame also supports the water tank 9 and the walls which define the air passages 18 and 22.

The discharge 32 of the blower 29 faces and aligns with the port 26. A damper 33 hinged as at 34 is arranged to swing between a position closing the discharge end 32 of the blower as shown in full lines in Figure 2, and a position closing the port 26, as shown in dotted lines in Figure 2. Any suitable means such as a weight 35 biases the damper to its first designated position, that is, closing the discharge of the blower.

A second damper 36 fixed with respect to the damper 33 is located in the hot air outlet duct 27 and in the normal free position of the dampers (maintained by the weight 35) closes this outlet.

The dampers 33 and 36 are automatically swung to their other positions (that is their dotted line positions in Figure 2) by the discharge of air from the blower 29. Accordingly, as long as the blower 29 is not in operation the room or space to be heated is disconnected from the furnace, but the air passages 18 and 22 are connected with one another through the plenum chamber 25 and the port 26. This situation obtains when the unit operates only to heat the domestic water, as during the summertime when it is obviously undesirable to discharge heated air into the living quarters.

For this water heating service the burner (not shown) is, of course, under the control of a thremostat also not shown, responsive to the temperature of the water and when this thermostat calls for heat the burner is turned on and the air in the passages 18 becomes heated and flows upwardly therethrough. In order to abstract the heat from the walls of the combustion chamber just as quickly as possible, the bottom 6 thereof and also its vertical side walls 7 are provided with extended surface 37 which, like the extended surface 13, preferably consists of wires or rods of copper or other high conductivity metal secured to the walls 6 and 7.

Similar extended surface 38 is fixed to those portions of the walls 7 which define part of the water tank, but as clearly shown in Figure 2, the spacing and consequently the total area of the extended surface 38 exceeds that of the extended surface 37. Consequently, the heat abstracted from the combustion zone by the air flowing upwardly through the passages 18 is quickly and effectively transferred to the water in the tank 9 and, of course, the heating effect of the flue gases rising up through the flue gas passage 11 and flowing across the extended surface 13 coacts with the heated air in the passages 18 to quickly bring the water to its desired temperature.

The air leaving the upper ends of the passages 18 enters the plenum chamber 25 and from there flows through the port 26 into the connected passages 22 to flow downwardly therein and re-enter the passages 18 through the opening 19 at the bottom of the furnace. This natural thermally induced circulation of the air effects very rapid heating of the water and obtains as long as the burner is in operation and the blower 29 is not operating.

During the heating season when the unit functions both as a hot air furnace and as a domestic water heater, the room thermostat (not shown) in calling for heat not only turns on the burner but also starts the blower 29. As the blower starts the air discharging therefrom automatically swings the dampers 33 and 36 to their dotted line positions shown in Figure 2 to close the port 26 and open the warm air discharge duct 27. The fresh incoming air discharging from the blower is thus positively circulated downwardly through all of the passages 18 to first abstract heat from the hot water in the tank and then be further heated by passage thereof across the walls of the combustion chamber and the extended surface 37. The air thus highly heated is discharged from the passages 18 through the opening 19 into the outer air passages 22 through which it flows upwardly to leave the furnace through the hot air outlet 27.

It is, of course, to be understood that even during the heating season there may be times when the room thermostat is not calling for heat but the water is below temperature. At such times the water-temperature-responsive thermostat turns on the burner to heat the water in the manner hereinbefore described without discharging hot air into the living rooms.

Figure 4:
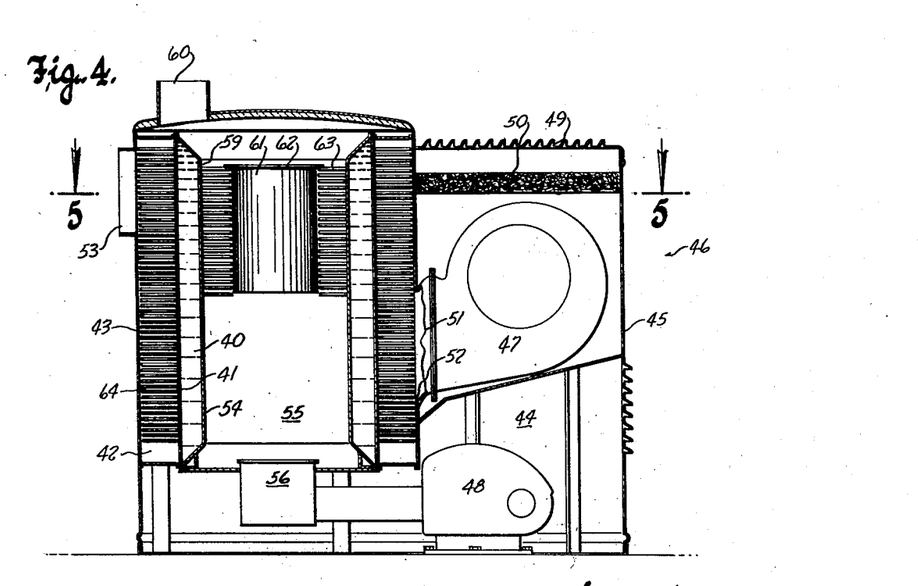
Figure 4 is a vertical sectional view similar to Figure 2 but illustrating a modified embodiment of the invention.
Figure 5:
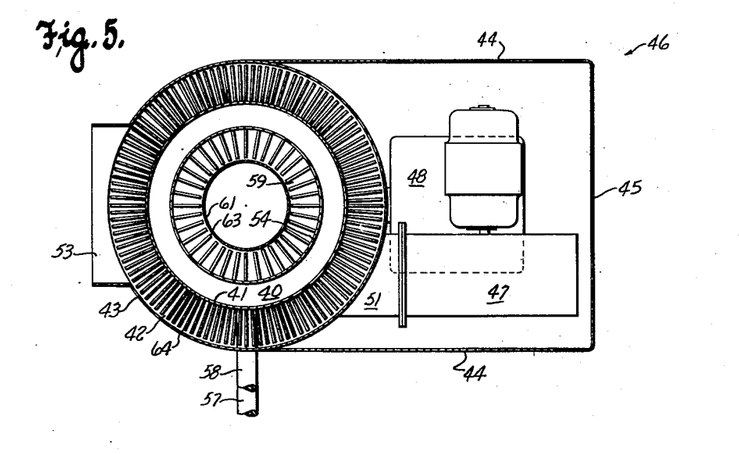
Figure 5 is a cross sectional view taken through Figure 4 on the plane of the line 5—5.

Though the modified embodiment of the invention illustrated in Figures 4 and 5 does not possess the flexibility of the preferred embodiment, it does, however, incorporate many of the features already discussed and particularly has the desirable advantage of a common wall between the water tank and the air heating passage.

To this end the heat exchanger has a water tank 40 which is annular and round in cross section, and has an outer wall 41 which provides the inner wall of an upright circular air passage 42. The outer wall 43 of this air passage defines a part of the exterior of the unit and is tangential to a pair of parallel side walls 44 which extend laterally therefrom and coact with an end wall 45 to define a casing indicated generally by the numeral 46 and within which the blower 47 and the burner unit 48 are located. A louvered air inlet opening 49 in the top of this casing provides for the admission of air to be heated and a conventional filter 50 is provided across the upper portion of the casing to filter the incoming air.

The discharge 51 of the blower is joined to the cylindrical outer wall 43 of the air passage in line with an inlet opening 52 therein. The incoming air thus enters the air passage 42 near the bottom thereof and flows tangentially into the lower portion of the air passage before rising upwardly to discharge therefrom through a hot air outlet 53.

The heat exchanger provided by the annular water tank 40 in this embodiment of the invention extends for the full height of the air passage and its inner wall 54 forms the sides of the combustion chamber 55 so as to be directly subjected to the radiant heat of the flame issuing from the burner nozzle 56. The water to be heated is fed into the tank 40 through an inlet 57 and the hot water is withdrawn therefrom through an outlet 58.

The flue gases leaving the combustion chamber flow upwardly through an annular flue gas passage 59 to a discharge duct 60. The annular flue gas passage 59 is defined by the inner wall 54 of the water tank and has a cylindrical baffle 61 therein. This baffle is closed at its top by a wall 62, and is located above the combustion zone. The baffle is supported in this position by the uppermost row of extended surface elements 63 which are fixed to the inner wall 54 of the water tank to project substantially radially inwardly across the annular passage 59 to thus efficiently abstract heat from the hot flue gases and conduct it into the water.

The outer wall 41 of the water tank is also provided with similar extended surface elements 64 which extend outwardly across the air passage 42 to efficiently transfer heat from the water to the air to be heated.

From the description thus far it will be appreciated that the annular water tank used in both embodiments of the invention provides an extremely efficient heat exchanger which employs a liquid heat transfer medium for transferring the available heat from the source to the air to be heated. The heat transfer medium, of course, comprises the water for domestic use. In addition, the heat exchanger is subjected to the radiant heat from the source at its input side as well as to the heat of the flue gases travelling through the central space defined by its annular tank, and though quite small, the extended surface on its inner wall has the effect of greatly increasing the heat absorbing surface of the exchanger and makes it possible to quickly transfer large amounts of heat to the liquid heat transfer medium in the tank.

The output side of the heat exchanger likewise has a heat dissipating surface of relatively great area for its small size, made possible through the use of extended surface elements on the outer wall of the annular tank, thereby making possible an extremely rapid transfer of heat from the liquid medium in the tank to the air passing over its exterior.

It will also be appreciated that both of the media to be heated, namely the air and water for domestic use, are not only heated indirectly from the heat source, but these media are passed in indirect heat transfer relation with one another, so that the temperature of one will have a modifying influence upon the temperature of the other. Because of this, all of the available heat from the source can be absorbed by either one or the other of the media to be heated, and in addition will be utilized automatically to heat both media in direct proportion to the demand.

Figure 6:
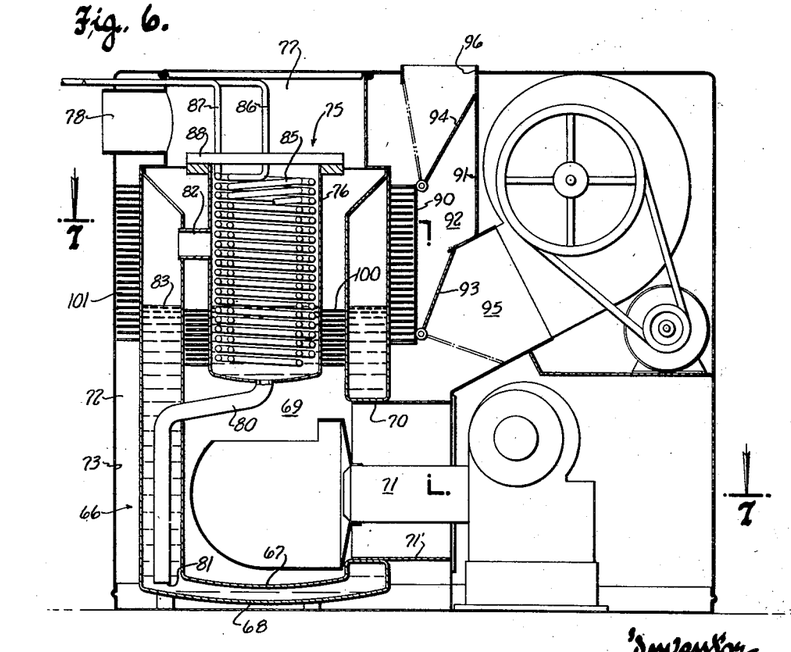
Figure 6 is a vertical sectional view similar to Figure 4 but illustrating another embodiment of the invention.
Figure 7:
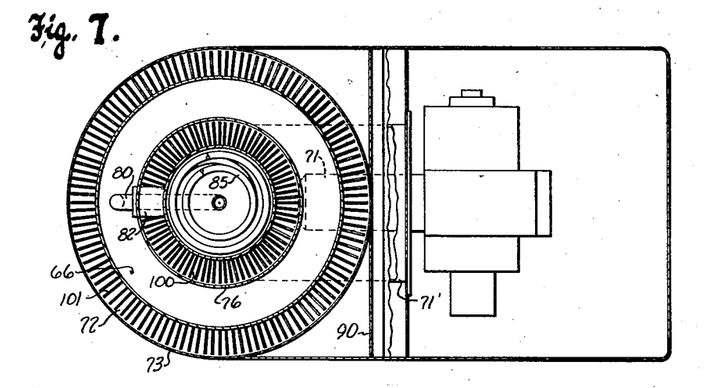
Figure 7 is a cross sectional view taken through Figure 6 along the lines 7—7.

The embodiment of the invention shown in Figures 6 and 7 is in many respects similar to that shown in Figures 4 and 5 but differs therefrom principally in that the heating of the two media is accomplished at least partially by passing a third fluid heat transfer medium in indirect heat exchange relation with both of the two media to be heated. This third medium may be either hot water or a combination of hot water and steam, which is the case in the combination unit shown in Figures 6 and 7.

As herein disclosed, the unit is provided with an upright annular water tank 66 comprising a main heat exchanger extending all the way down to the bottom of the unit where spaced bottom walls 67 and 68 each joining with one of the upright walls of the tank provide water space in the lower end of the tank. The central space defined by the lower portion of the annular tank also provides a combustion chamber 69, access to which is had through an opening 70 in one side of the annular tank near its bottom. This opening, of course, accommodates the nozzle 71 of an oil burner of other flame producing means.

The annular tank 66 in this case is used primarily for heating the air which may be circulated through an annular passage 72 around the exterior of the main heat exchanger and defined conjointly by the outer wall of the annular tank and a shell 73 encircling the same in spaced relation thereto.

The water for domestic use is heated by a secondary heat exchanger 75 forming a part of the main heat exchanger. The secondary heat exchanger comprises a cylindrical tank mounted in the flue gas passage defined by the central space in the upper portion of the tank 66 with its cylindrical side wall 76 in spaced concentric relation to the inner wall of the tank 66. Consequently hot gases rising from the combustion chamber are constrained to flow over the inner wall of the annular tank 66 and over the cylindrical wall 76 of the secondary heat exchanger to reach an exhaust gas chamber 77 at the top of the furnace. From the chamber 77, the gases pass out of the furnace through a duct 78 opening to the cylindrical side wall 79 of the chamber 77 and extending through the adjacent side of the shell 73.

A duct 80 connected with the bottom of the secondary heat exchanger projects laterally therefrom into the inside of the annular tank 66 and is then directed downwardly to terminate as at 81 at a point close to the bottom of the main heat exchanger. In addition to the communication between the two heat exchangers provided by the duct 80, they are additionally communicated by a short duct 82 extending substantially radially between their upper portions, a slight distance above the level 83 of water which is maintained in the two heat exchangers.

As stated previously, the water for domestic use is heated in the secondary heat exchanger 75 and for this purpose a double heating coil 85 is disposed therein. The inlet and outlet ends 86 and 87 respectively of the heating coil extend upwardly through a cover 88 closing the top of the secondary heat exchanger, and are connectible respectively with the source of water to be heated and the various taps controlling the withdrawal of heated domestic water from the unit.

Air to be heated is introduced to the air heating passage 72 at an area adjacent to the opening in the side of the annular tank 66. For this purpose, the portions of the shell adjacent to and for a slight distance above the opening 70 are cut away, and a transverse baffle 90 is mounted vertically in the furnace, substantially tangent to the shell above the cut-away portion thereof. The lower edge of this baffle terminates a slight distance above the periphery of the tube 71' surrounding the burner nozzle 71, and its upper edge terminates a distance beneath the top wall of the furnace housing.

The inner transverse wall 91 of the blower housing is spaced from and substantially parallel to the baffle 90 and cooperates therewith to provide an upright passage 92, and dampers 93 and 94 hingedly mounted in the furnace housing for swinging motion about horizontal axes adjacent to the lower and upper edges respectively of the baffle 90 make it possible to direct the air discharging from the outlet 95 of the blower downwardly around the lower edge of the baffle and thence upwardly through the passage 72 and across the exterior of the main heat exchanger to be heated thereby, or upwardly in the passage 92 thereby by-passing the main heat exchanger, depending upon the positions of the dampers 93 and 94. Such by-pass takes place when these dampers are in their positions shown in construction lines in Figure 6, and the air flowing upwardly in the passage 92 passes out of the furnace housing through a port 96 in the top thereof. This port also communicates with the heating passage 72 through the space in the top of the furnace around the wall 79 of the flue gas chamber 77. Consequently, when the dampers are in their positions shown in solid lines, the air which is heated by circulation over the exterior of the main heat exchanger in the passage 72 will discharge through the port 96 for distribution to the living quarters.

The by-pass arrangement, of course, allows cool air from the basement (containing the heating unit) to be circulated into the living rooms.

Extended surface elements 100 on the exterior of the cylindrical wall 76 of the secondary heat exchanger 75, at least at its lower portion, assure abstraction of as much of the heat from the flue gases as is possible; while similar extended surface elements 101 fixed to the exterior of the water tank 66 of the main heat exchanger, at least on its upper portion above the lower edge of the baffle 90, assure highly efficient transfer of heat from the main heat exchanger to the air circulated upwardly along its exterior.

In the use the combined air and water heating unit shown in Figures 6 and 7 is controlled in a manner similar to that previously described; that is, the oil burner will be placed in operation at the dictate of a thermostat, not shown, responsive to the temperature of the water issuing from the heating coil 85 whenever there is a demand for hot water for domestic use. Both heat exchangers 66 and 75 are subjected to radiant heat from the source thereof while the secondary heat exchanger 75 absorbs additional heat from the combustion gases flowing thereover. Consequently, if the demand for hot water for domestic use is great enough, the fluid heat transfer medium in the secondary heat exchanger will be cooled by the rapid circulation of the cooler domestic water through the coils 85, thereby inducing natural circulation of the fluid heat transfer medium downwardly through the duct 80 and into the bottom portion of the main heat exchanger 66. Steam generated in the main heat exchanger will flow into the upper portions of the secondary heat exchanger through the duct 82 so that all of the available heat from the source is directed into the secondary heat exchanger to quickly heat the water flowing through the coils 85.

Assuming that there is a great demand for hot air, such as might be the case on a cold morning when it is desired to quickly raise the temperature in the living quarters, the blower and the oil burner are placed in operation at the dictate of the room thermostat, not shown, and the air in passing upwardly through the air heating passage 72 surrounding the main heat exchanger is quickly heated thereby. Since such passage of air over the exterior of the main heat exchanger exerts a cooling effect upon the heat transfer medium in the tank 66, the natural circulation of the fluid in the two heat exchangers will be the reverse of that previously described. In other words, steam will now be generated in the secondary heat exchanger and will flow through the duct 82 into the upper portion of the main heat exchanger to supply adequate heat to the air flowing over its exterior.

During periods of normal demand for hot air and hot water for domestic use, the available heat will be divided between the two media to be heated in whatever proportions are necessary to meet the demands. This is made possible by reason of the fact that both of the media are heated by indirect heat exchange with a third medium, namely the fluid heat transfer medium in the connected main and secondary heat exchangers.

Figure 8:
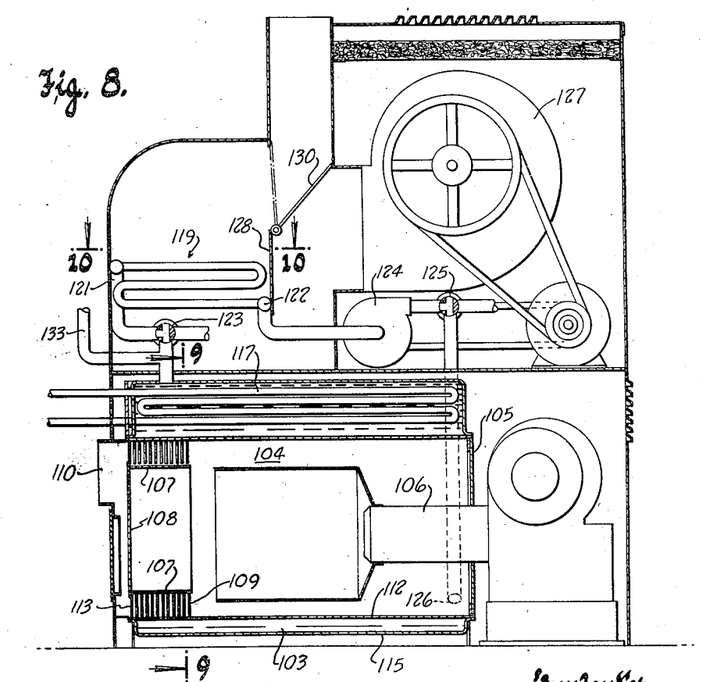
Figure 8 is a vertical sectional view of still another combined hot air and domestic hot water heater embodying the principles of this invention.
Figure 9:
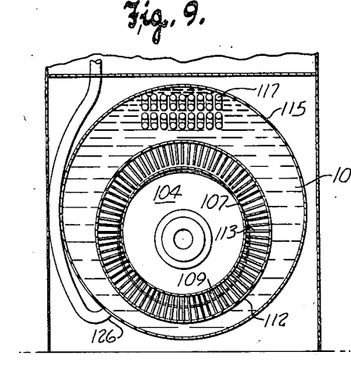
Figure 9 is a cross sectional view taken through Figure 8 along the plane of the line 9—9.
Figure 10:
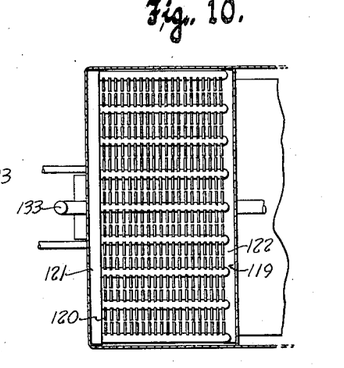
Figure 10 is a sectional view taken through Figure 8 along the plane of the line 10—10.

Figures 8, 9 and 10 disclose still another form of combined hot air and domestic water heater wherein the two media to be heated are passed in heat exchange relation with a third medium which comprises hot water contained in an annular tank 103 disposed on a horizontal axis with the central space defined thereby again providing a combustion chamber 104. One end of the annular tank 103 is closed by a wall 105 having a suitable opening therein to admit the nozzle 106 of an oil burner or the like. Walls 107 and 108 in the combustion chamber at the opposite end of the tank define an annular passage 109 through which the gaseous products of combustion flow to reach a discharge duct 110 passing through the side of the housing of the unit.

Water contained in the tank 103 is heated by radiation from the heat source and receives additional heat from the flue gases passing through the passage 109, and for this latter purpose the inner wall 112 of the tank has radially inwardly projecting extended surface elements 113 thereon disposed in the passage 109.

The outer wall 115 of the annular water tank 103 is eccentric to its inner wall to provide room inside the tank, above the combustion chamber, for a bank of heating tubes 117 through which the domestic water may be circulated to be heated by the hot water in the tank.

In this case also the annular tank 103 may be considered as a main heat exchanger, although it is utilized primarily for heating the domestic water. A secondary heat exchanger 119 is provided for heating the air, and it comprises a bank of tubes, all provided with extended surface elements 120 as shown in Figure 10, connecting with inlet and outlet headers 121 and 122, respectively. The inlet header 121 is communicated with the interior of the tank 103 at its top through a three-way valve 123, and the outlet header is communicated with the inlet of a pump 124 having its discharge communicated through another three-way valve 125 with the interior of the tank near its bottom, as indicated at 126.

Consequently, when the valves are set in proper positions and the pump is in operation, hot water from the main heat exchanger is forcefully circulated through the secondary heat exchanger 119 to effect rapid heating of the air discharging from the blower 127.

The positions of the secondary heat exchanger 119 and the blower 127 relative to a baffle 128 are similar to the corresponding elements of the embodiment previously described. The secondary heat exchanger 119 is located at one side of the baffle over that end of the tank from which flue gases leave the unit, and the blower is located at the opposite side of the baffle but has its discharge 129 facing the same. A manually operable damper 130 is also provided to direct air either downwardly and under the lower edge of the baffle and thence across the secondary heat exchanger and out the passage 131 for heated air; or to allow air discharging from the blower to by-pass the secondary heat exchanger and flow directly out through the passage 121.

In this form of the invention also the air and domestic water are heated by indirect heat exchange with a heat transfer medium common to both media to be heated, namely, the water heated in the main heat exchanger and circulated through the secondary heat exchanger by the pump 124.

This embodiment of the invention has a further advantage in that it may be used to cool the air in the summer months while at the same time allowing the water for domestic use to be heated therein. This is accomplished by rotating the valves ninety degrees clockwise from their positions shown, to disconnect the secondary heat exchanger from the main heat exchanger 103, and to allow a cooling medium such as cold water, for instance, to be circulated through the secondary heat exchanger 119 by the pump 124. Hence, air circulated over the secondary heat exchanger by the blower will be cooled for delivery to the living quarters of the dwelling.

For normal operation during those seasons of the year when it is desired to heat both the air and the water for domestic use, the unit shown in Figures 8 to 10 will have all of the advantages previously described. It will also be understood that if desired the main heat exchanger 103 may be communicated with an expansion tank, not shown, as by means of a duct 133.

A further feature of this invention is that it lends itself exceptionally well to the use of heat exchangers of standardized design and size, so that the capacity of the combined heater may be increased merely by the use of two or more identical heat exchangers without materially increasing the size of the combined unit. One way in which a plurality of such heat exchangers may be employed in a small but efficient combined air and water heater is disclosed in Figures 11 and 12. As herein shown, the combustion chamber 135 is again provided by the central space defined by an annular water tank or steam boiler 136 disposed with its axis horizontal, in the same manner as in the Figure 8 embodiment of the invention; while the arrangement disclosed in Figure 6 is followed for the blower 137 and the dampers 138 and 139 which permit either heating of the air discharged by the blower or by-pass of said air substantially directly out of the unit through the port 140.

Figure 12:
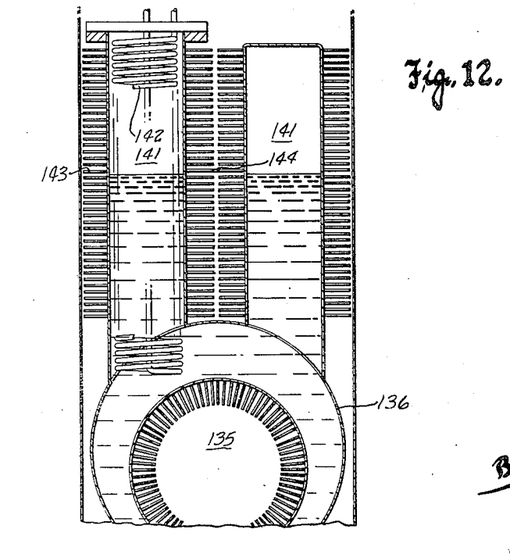
Figure 12 is a sectional view taken through Figure 11 along the plane of the line 12—12.

As shown best in Figure 12, the tank or boiler 136 is provided with two relatively small diameter pipe-like extensions 141 extending vertically upwardly from the top of the tank in open communication with the interior thereof, at opposite sides of a vertical plane containing the horizontal axis of the tank. These extensions are closed at their tops and provide a pair of heat exchangers containing a fluid heat transfer medium, in the present case partly hot boiler water and partly steam.

Figure 11:
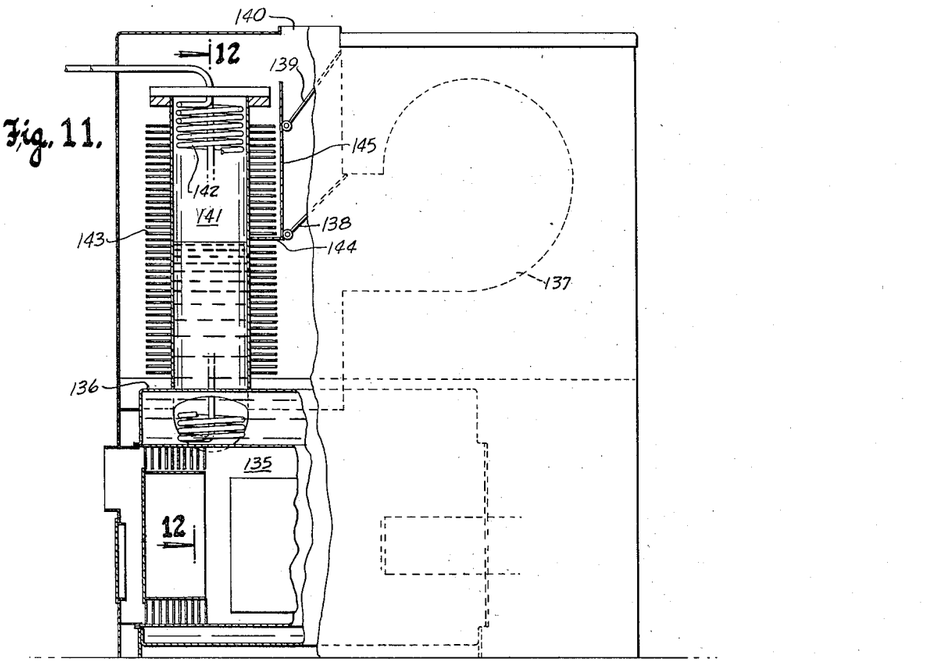
Figure 11 is a view partly in vertical section and partly in elevation showing still another form of combined hot air and domestic water heater embodying the principles of this invention.

The water for domestic use is passed in indirect heat exchange relation to the fluid in one of the heat exchangers as by circulation of such water through a coil 142 disposed in its interior. If necessary, two coils 142 may be used, one in each of the heat exchangers, but this ordinarily will not be necessary unless an unusually great demand for hot water for domestic purposes is anticipated.

The air to be heated is circulated over the exterior surfaces of both of said pipe-like extensions. For this latter purpose both heat exchangers provided by the pipe-like extensions 141 have extended surface elements 143 fixed to their exteriors to enable heat to be transferred quickly and efficiently from the hot fluid therein to the air circulating upwardly over their exteriors.

Due to the side-by-side positioning of the two heat exchangers 141, baffle means 144 extending horizontally from the hinged end of the lower damper 138, around the outer ends of the extended surface elements, approximately to the plane containing the axes of both exchangers, prevents the air to be heated from passing directly upwardly around the lower edge of the vertical baffle 145. Without the horizontal baffle means, the air to be heated would come into contact with only a small portion of the air heating surfaces of the heat exchangers.

In other words, the air to be heated is directed partly by the damper 138 and partly by the baffle means 144 over the lower portions of the two heat exchangers 141 before it can pass upwardly thereover for discharge through the port 140.

From this it will be seen that without making the unit disclosed in Figures 11 and 12 substantially any larger, the heating capacity of the unit can be substantially doubled merely by the provision of a second pair of upright heat exchangers 141 similarly connected to the top of the annular tank or boiler 136 at areas displaced longitudinally along its exterior from the two heat exchangers shown.

From the foregoing description taken in connection with the accompanying drawings, it will be readily apparent to those skilled in the art that this invention provides a combined hot air furnace and domestic water heater which because of its novel construction and adaptation of extended surface is far more efficient and compact than units of this type heretofore available; and in which the available heat is automatically proportioned to the two media to be heated in accordance with the varying demands for heat.

What I claim as my invention is:

1. A combined hot air furnace and domestic water heater unit, comprising: walls including upright side and end walls defining a casing for the entire unit; a horizontal partition wall joining the side and end walls and dividing the casing into a combustion compartment and an air heating compartment, the latter being above the former; a primary heat exchange unit in the combustion compartment, said unit comprising an inner shell defining a combustion chamber, a heat source in said combustion chamber and means including an outer shell encircling the inner shell in spaced relation thereto and cooperating therewith to define an annular water space closed at its opposite ends and adapted to hold water, the top of the annular water space being directly below said horizontal partition; wall means mounted in the inner shell adjacent to one end thereof and in spaced relation to the wall of the inner shell to define a substantially annular exhaust gas passage through which combustion gases leave the combustion chamber; wall means defining a discharge duct leading from said exhaust gas passage and passing through the adjacent upright wall of the casing, and through which the exhaust gases leave the furnace; extended surface rods on that portion of the inner wall of the shell which forms part of the exhaust gas passage, projecting into and substantially across the exhaust gas passage to abstract heat from the combustion gases as they flow from the combustion chamber to the discharge duct, and to transfer such heat to the water in the water space; a domestic water heating coil in said annular water space through which water to be heated for domestic purposes may be circulated and heated by the water in the water space; means within the air heating compartment coacting with said horizontal partition, to define an air heating passage; a secondary heat exchange unit in the air heating passage, comprising a coil through which water may flow, and extended surface rods projecting from the exterior of said coil with all of the rods substantially parallel to one another, said coil and the rods projecting therefrom being disposed transversely across the air heating passage with the rods substantially uniformly distributed across the entire cross section of the air heating passage; duct means connecting the opposite ends of said coil of the secondary heat exchange unit with the annular water space to provide therewith a closed circulatory system by which heat is indirectly transferred from the heat source in the combustion chamber to the secondary heat exchange unit; and a blower in the air heating compartment of the casing connected with the air heating passage for circulating air to be heated through said passage.

2. The structure of claim 1 further characterized by the fact that the inner and outer shells of the primary heat exchange unit are cylindrical and have their axes horizontal but displaced vertically from one another with the axis of the outer shell above that of the inner shell so that the shells are disposed eccentrically to one another and the annular water space between the shells is largest at the top; the domestic water heating coil being located in the upper portion of said annular water space.

References Cited in the file of this patent

UNITED STATES PATENTS

| | | |
|---|---|---|
| 1,640,317 | Haas | Aug. 23, 1927 |
| 1,889,588 | Anderson | Nov. 29, 1932 |
| 1,980,688 | Lewis | Nov. 13, 1934 |
| 2,129,202 | Drewry | Sept. 6, 1938 |
| 2,159,284 | Miller | May 23, 1939 |
| 2,203,187 | Arter | June 4, 1940 |
| 2,225,023 | Watt | Dec. 17, 1940 |
| 2,244,831 | Drichta | June 10, 1941 |
| 2,249,554 | Daly | July 15, 1941 |
| 2,435,875 | De Lore | Feb. 10, 1948 |
| 2,440,052 | Lingen | Apr. 20, 1948 |
| 2,526,464 | Folk | Oct. 17, 1950 |
| 2,533,508 | Riu | Dec. 12, 1950 |
| 2,556,671 | Auslander | June 12, 1951 |
| 2,637,314 | Wallis | May 5, 1952 |